United States Patent
Garabedian

[15] 3,651,772
[45] Mar. 28, 1972

[54] METHOD AND SEED PELLET FOR USE IN PLANTING AGRICULTURAL CROPS

[72] Inventor: Ross V. Garabedian, 921 Van Ness Avenue, Fresno, Calif. 93721

[22] Filed: Nov. 21, 1969

[21] Appl. No.: 878,781

[52] U.S. Cl. ............................... 111/1, 111/DIG. 1, 47/57.6
[51] Int. Cl. ........................................................ A01c 1/06
[58] Field of Search ..................... 47/58, DIG. 9, 57.6; 111/1

[56] References Cited

UNITED STATES PATENTS

| 1,278,216 | 9/1918 | Reid | 47/58 |
| 2,592,052 | 4/1952 | McKenna | 47/58 |

FOREIGN PATENTS OR APPLICATIONS 107,958  6/1927  Austria ............................. 47/DIG. 9

OTHER PUBLICATIONS

Evening Star; Washington, D.C., May 22, 1953, page A-8 relied on

Primary Examiner—Robert E. Bagwill
Attorney—Huebner & Worrel

[57] ABSTRACT

A method and seed pellet particularly suited for use in planting agricultural crops characterized by the provision of seed pellets including frozen bodies of selected fluids such as water or aqueous solutions of selected chemicals, such as fertilizers, herbicides, pesticides and the like, having discrete plant seeds embedded therein, and depositing the pellets in the soil, a feature of the invention being the adaptability thereof for use in planting relatively small seeds with a selected, uniform spacing and shallow covering in a moisturized environment.

6 Claims, 7 Drawing Figures

PATENTED MAR 28 1972  3,651,772

ROSS V. GARABEDIAN
INVENTOR

Huebner & Worrel
ATTORNEYS

METHOD AND SEED PELLET FOR USE IN PLANTING AGRICULTURAL CROPS

BACKGROUND OF THE INVENTION

The invention relates to a method and a seed pellet particularly suited for use in planting agricultural crops.

Historically, seeds employed in farming operations have been planted by employing various methods including sowing the seed broadcast upon the surface of the soil and covering the seed with particles of pulverized surface soil, depositing seed in openings formed in the surface of a prepared body of soil and covering the deposited seed to selected depths or by metering the seed into a furrow and subsequently covering it. More recently, it has been proposed that seed can be encased in strips of decomposable materials and deposited in the soil.

While all of the aforementioned techniques have met with various degrees of success, each technique is subject to certain limitations. For example, where the seed is sown on the surface of pulverized soil, in a manner often called "broadcasting," there is no practical manner in which the resulting crop can be cultivated during its growing season. Also its density of distribution cannot be accurately controlled. In instances where openings are formed in the surface of prepared seed beds with seeds being ultimately deposited therein, difficulty often is encountered in covering the seed to appropriate depths. This is particularly true when the crop being planted requires that the seed be planted with a shallow compacted covering and mechanical devices are employed in the planting of the seed.

Furthermore, where seeds having relatively large dimensions are employed, complexity in seed handling normally is minimal, however, where the seeds are relatively small, such as where lettuce, mustard, onions, and the like, are being planted, the seeds are particularly difficult to "drop" at selected intervals and thus their density and spacing cannot be accurately controlled. Consequently, it is a common practice to "sow" the seed, employing devices such as drills, and subsequently to "thin" the plants once the seeds have germinated. This, of course, results in considerable waste in seed, fertilizer and labor.

When planting agricultural crops employing any of the aforementioned methods, it is desirable that the soil be relatively dry to accommodate pulverizing of the soil so as to achieve a good seed bed and to support workmen or equipment, such as drills, row planters and the like, utilized in planting operations without undesirable soil compaction. This is particularly true where the seeds to be planted are too small to readily be planted by hand thus precluding the use of hand-planting techniques.

Furthermore, heretofore it has been common practice to deposit seed in the soil and permit the seed to soften and germinate in response to the presence of rain water, or applied irrigation water. In either event, the seed normally is planted in a substantially dry condition and subsequently softened through the use of moisture in the soil. This, of course, requires the seeds to be planted either when abundant moisture is present in the soil or, alternatively, requires rain or the delivery of irrigation water to the soil after planting. The result may be disastrous, particularly where dry weather persists, or difficulty, such as flooding, is encountered in employing irrigation water.

Many seeds, such as, for example, the seeds of certain conifers, germinate more readily following a protracted dormant period at a low temperature. To a lesser degree, this is true of most seeds. Hence, where seeds of this nature are to be planted while simulating indigenous climatic conditions, often it is necessary artificially to chill seeds prior to delivering them to the soil for germination.

Another common difficulty encountered in growing the majority of crops is the requirement that weeds be removed during the early stages of the plant's growth, or even prior to the seed's germination, to minimize competition. Weed control of certain crops often is quite difficult, particularly where selected plants are interspersed in a concentration of weeds. Normally, it is necessary that the crops be hoed or, where practical, herbicides be applied for purposes of removing the weeds in order that the preferred plants will not be required to compete with the hardier weed plants for plant food, sunlight and moisture.

OBJECTS AND SUMMARY OF THE INVENTION

This invention minimizes or overcomes the aforementioned difficulties through the provision of a novel method employing seed pellets including discrete seeds of selected varieties of plants embedded in bodies of frozen water, or aqueous solutions or suspensions of various chemicals or other environmental factors such as fertilizers, herbicides, fungicides, pesticides, humus and the like, to form sizeable pellets which are subsequently sown upon the surface of a body of soil, dropped in hills, or sown in drills and embedded in the soil so that as the pellets melt the seeds are released and deposited in fertilized and/or moisturized beds and covered through the inherent tendency of wet soils to cling and dry soils to sluff to determinable angles of repose.

Accordingly, an object of the instant invention is to provide an improved method of planting agricultural crops.

Another object is to provide an improved method of planting crops wherein discrete seeds individually are placed in the soil in bodies of aqueous materials frozen into discrete, solid masses.

Another object is to provide an improved method of planting agricultural crops wherein seed pellets are planted at selected depths, without employing a pellet-covering step for covering of the seed pellets.

Another object is to provide an improved seed pellet which is employed in planting a selected seed by delivering the pellet to the surface of a body of soil, without requiring a delivery of a layer of soil for thus covering the seed.

Another object is to provide improved pellets for encasing discrete seeds wherein each seed is embedded in a material particularly selected for plant growth enhancement.

Another object is to provide an improved seed pellet which facilitates accurate planting of seeds, even of relatively small dimensions, by hand or planting mechanism.

Another object is to provide a frozen seed pellet wherein individual seeds are disposed within the body of a frozen material particularly adapted to enhance seed germination and/or weed control, and which simultaneously conditions the seed and the soil for enhancing seed germination as the frozen material is thawed.

These together with other objects and advantages will become more readily apparent by reference to the following description and claims in light of the accompanying drawing.

DESCRIPTION OF THE PREFERRED EMBODIMENT

Figure 1:
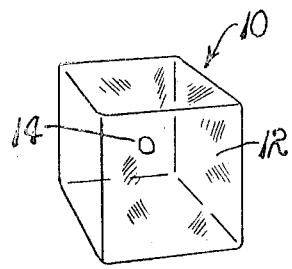
FIG. 1 is a perspective view of a seed bearing pellet embodying the principles of the present invention.

Referring particularly to FIG. 1, therein is illustrated a seed pellet 10 of a cubic configuration embodying the principles of the present invention.

As illustrated, the pellet 10 is formed of a body of frozen water or ice 12 having approximately centered therein a seed 14 of a selected plant. While the seed 14 may be from any one of the innumerable varieties of plants, the method embodying the principles of the present invention is particularly suited for use in planting such crops as lettuce, onions, mustard and other minute seeds. Accordingly, for purposes of describing the invention it will hereinafter be assumed that the body of ice 12 encapsulates a seed of lettuce.

It has been found that in order to assure a proper depositing of the lettuce seed 14 within a "hill," the seed 14 should be disposed near the center of the pellet 10. This can be achieved by utilizing various, readily available freezing techniques. For example, the pellet 10 may be formed in a mold of a configuration similar to a cubed tray of the type commonly employed in the freezing of ice cubes for domestic use. Normally, the seed being embedded is not as dense as water and therefore tends to float partially submerged near the surface of the water. Therefore, by filling the mold approximately halfway and partially freezing the contents of the mold, particularly at its surface, the seed may be secured near the top surface of the thus partially formed pellet. The partially formed pellet is completed simply by adding additional fluids to the mold and completing a freezing of the pellet. Of course, should the seed be heavier than water, the pellet 10 can be formed employing a technique quite similar to that hereinbefore disclosed, except that the pellet 10 is inverted prior to its completion through an addition of additional fluids and subsequent freezing. In actual practice, it is preferred that the pellets be formed automatically in any suitable ice forming machine.

Once the pellet 10 is formed, it is stored in any suitable manner and delivered to the field in a frozen condition. Planting of the seed is achieved by any suitable mechanical or manually operated means which permits the pellet 10 to be deposited on the surface of a body of soil 16 and pressed downwardly employing any suitable device, including a convenient roller so that the pellet 10 serves to separate the soil and form openings 15 in the surface of the soil with the seeds 14 being deposited therein. As should readily be apparent, the weight of the pellet could be employed for purposes of forming the opening 15 as the pellet 10 is dropped.

Figure 2:
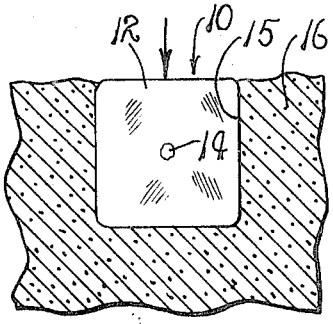
FIG. 2 is a sectional view of the pellet of FIG. 1 deposited for planting a seed within a body of soil.
Figure 3:
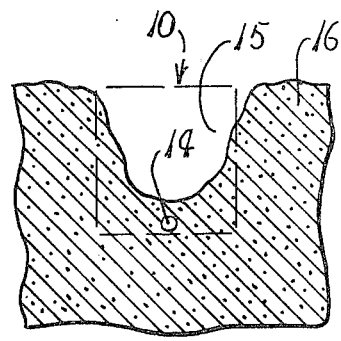
FIG. 3 is a sectional view of a planted seed, illustrating the relationship of the body of soil, subsequent to a thawing of the pellet.

As best illustrated in FIG. 2, ambient temperatures cause the frozen body 12 to melt and the seed 14 to drop downwardly to a position near the bottom of the opening 15. Of course, as thawing of the pellet occurs, the soil near the bottom of the opening 15 becomes saturated with water and permits the seed to become inundated in a muck of a desired composition, which upon drying forms a coalesced coating of soil on the surface of the seed 14. Additionally, there is a tendency for the sides of the openings 15 to sluff inwardly for finally achieving a covering of the seeds as the soil seeks its natural angle of repose.

Figure 4:
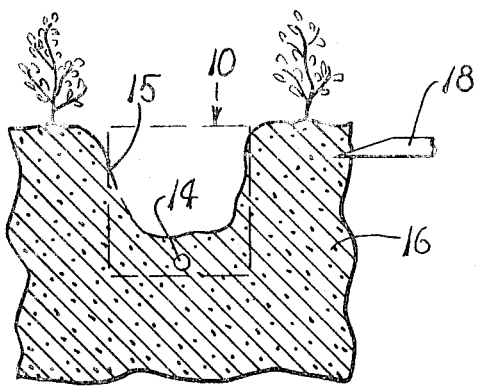
FIG. 4 is a sectional view of the planted seed illustrated in FIG. 3, further illustrating the position of a weed-knife which may be employed in removing weeds from the vicinity of the seed, and/or the resulting plant as germination occurs.

As the seed is permitted to germinate, weeds surrounding the opening 15, as illustrated in FIG. 4, may be removed through the use of any suitable tilling device, such as a simple weed-knife 18. This is particularly true where the pellet 10 is of a size sufficient for causing the opening 15 to be relatively deep so that the seed and/or the resulting plant is not subject to injury as the weed-knife 18 is drawn through the soil for severing the roots of the weeds above the level of the germinated seed.

Figure 5:
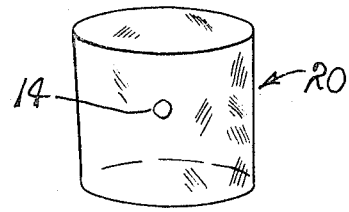
FIGS. 5 and 6 illustrate alternate configurations for the pellet.
Figure 6:
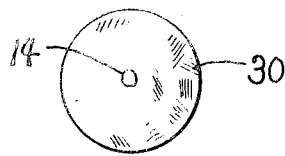

As best shown in FIG. 5, a cylindrical, rodlike pellet 20 may be employed for seeds 14 of a type which require deep-rooting and shallow covering since this configuration permits the resulting opening to be relatively deep, while the seed is covered with a minimal quantity of earth. Of course, when employing a pellet of a rodlike configuration, preferably, the pellet 20 is inserted end first into the soil in order that deep-planting with shallow covering ultimately is realized.

Additionally, under various soil and climatic conditions it may be found practical to employ pellets 30 of spherical configurations for the seed 14, as illustrated in FIG. 5, particularly in instances where planting is achieved through broadcasting and it is desired that the depth of soil covering provided for the seed 14 is increased, or that the seeds be planted at a substantially uniform depth throughout a given area. In these instances, the configuration of the bottom of the opening 15 will be hemispherical and a scattering of soil near the surface of the body of soil 16 will cause the pellet to become partially covered prior to a completion of the thawing of the pellet.

Figure 7:
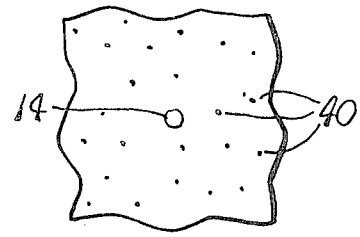
FIG. 7 is a pictorial view illustrating a seed pellet containing therein frozen particles of materials such as herbicides, pesticides, fertilizer and humus.

As best illustrated in FIG. 7, where found desirable, the seed 14 may be embedded in a frozen body of fluid, formed as an aqueous solution and/or suspensions of selected chemicals, such as various types of chemical fertilizers, herbicides, fungicides and even pesticides, designated 40. In such instances the chemicals or other factors are dissolved or suspended in water and the resulting solution or mixture employed in forming the pellets. Furthermore, various solid materials such as powdered humus may be added to the solution, prior to freezing, in order that the seed be deposited in a coating of preselected materials as the pellet is melted. Of course, the resulting pellet configuration is not dependent upon the material employed in forming the pellets.

Further major advantages are that even the smallest seeds when encapsulated in the frozen pellets can be accurately metered during planting operations, precisely positioned and properly spaced. Thus, the amount of seed required can be reduced to a fraction of that previously needed, particularly in view of the significantly improved rate of germination. Thinning operations can be rendered unnecessary. Precise rows of accurately spaced plants can be attained so as to facilitate subsequent weeding and cultivation. Mechanical weeding is made practical. Each plant can be assured proper growing room for optimum production.

In view of the foregoing, it should be apparent that the instant invention provides an improved method for planting seeds wherein the pellets are particularly adapted for planting crops requiring shallow covering, without regard to soil moisture content.

Although the invention has been herein shown and described in what is conceived to be the most practical and preferred method and embodiment, it is recognized that departures may be made therefrom within the scope of the invention.

Having described my invention, what I claim as new and desire to secure by Letters Patent is:

1. In a method of producing crops from seeds planted in a body of soil and provided with a shallow covering layer of soil of a given thickness less than the depth to which the seeds are planted beneath the surface of the body, the steps of:
   A. encapsulating a selected seed in a pellet of ice having predetermined length and width dimensions; and
   B. pressing the pellet substantially downwardly into the surface of the body of soil through a distance sufficient for establishing a substantially coplanar relationship between the upper surface of the pellet and the surface of the body of soil for thereby depositing the pellet in an opening having a lateral dimension dictated by the width of the pellet, and a depth dimension dictated by the length of the pellet, the ratio of width to length being such that a substantial quantity of soil is permitted to slough into the opening, subsequent to a melting of the pellet, for thereby providing a covering layer of soil of a predetermined thickness less than the depth of the opening for placing the seed in the body at a preselected depth relative to the surface of the body and covering the seed with a layer of soil having a thickness less than said preselected depth.

2. The method of claim 1 wherein the step of encapsulating said seed in a pellet of ice includes the additional steps of:
   partially filling a fluid-confining mold with a given quantity of water, depositing said seed in said quantity of water, freezing the water into a first solid mass, depositing on the upper surface of said first mass an additional quantity of water, and finally freezing said additional quantity of water into a second solid mass integral with said first solid mass.

3. The method of claim 1 wherein said pellet contains selected chemicals dispersed in a predetermined concentration.

4. The method of claim 1 wherein said pellet is of a rodlike configuration.

5. The method of claim 1 wherein said pellet is of a cubic configuration.

6. The method of claim 1 wherein said pellet is of a spherical configuration.

* * * * *